Figures 1, 2:
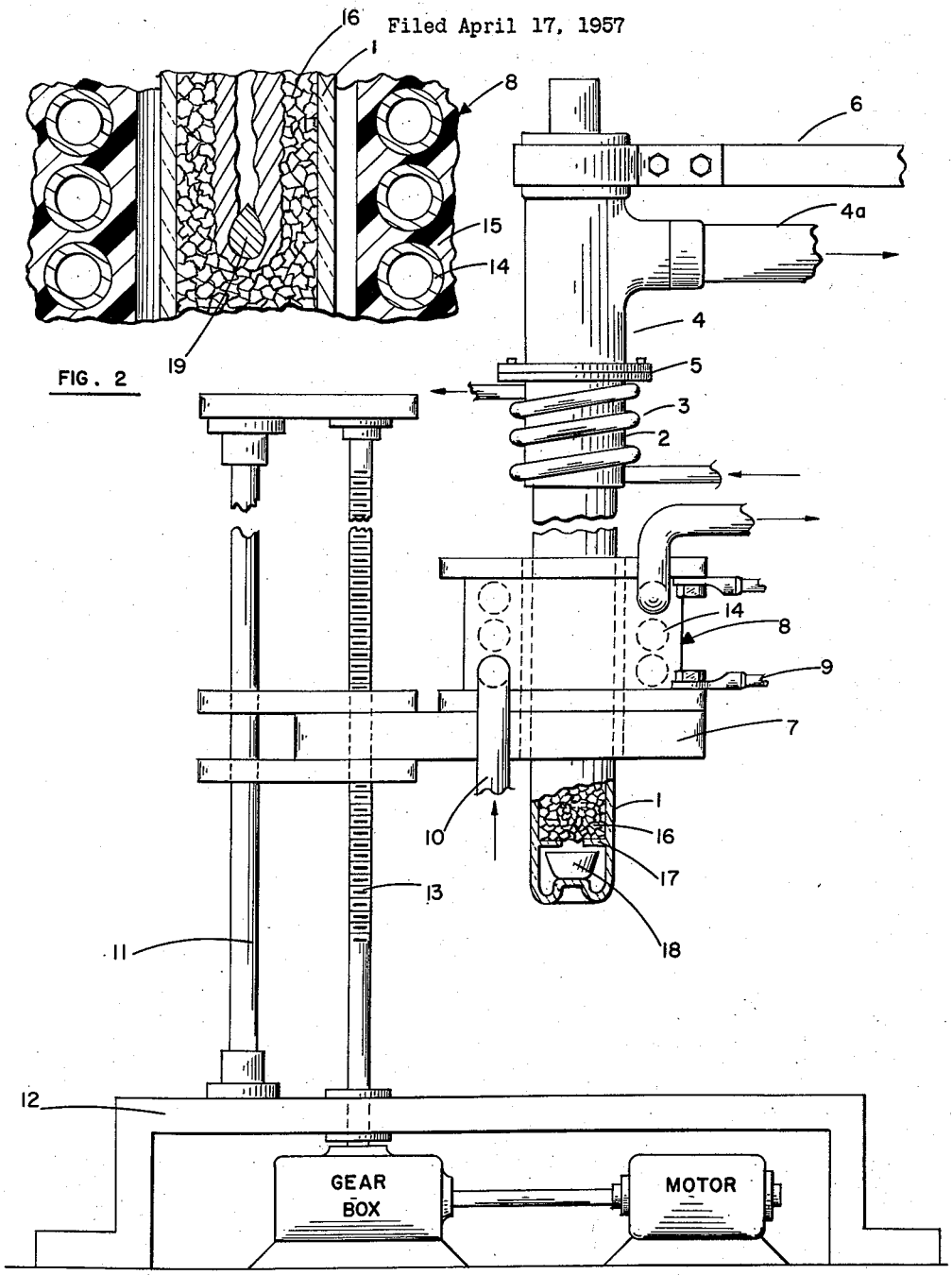

Dec. 22, 1959 A. G. BUYERS ET AL 2,918,366
DECONTAMINATION OF NEUTRON-IRRADIATED REACTOR FUEL
Filed April 17, 1957

INVENTOR.
ARCHIE G. BUYERS
FRED D. ROSEN
ERCOLE E. MOTTA
BY
Gerald G. Koris
ATTORNEY

United States Patent Office 2,918,366
Patented Dec. 22, 1959

2,918,366

DECONTAMINATION OF NEUTRON-IRRADIATED REACTOR FUEL

Archie G. Buyers, Woodland Hills, Ercole E. Motta, Canoga Park, and Fred D. Rosen, Bellflower, Calif., assignors, by mesne assignments, to the United States of America as represented by the United States Atomic Energy Commission Application April 17, 1957, Serial No. 653,500

7 Claims. (Cl. 75—84.1)

Our invention relates to a method of decontaminating neutron irradiated reactor fuel, and more particularly to an improved method and apparatus for decontaminating such fuel by a pyrometallurgical method.

For information concerning the theory, construction and operation of nuclear reactors, reference is made to Glasstone, Principles of Nuclear Reactor Engineering (D. Van Nostrand Co.); The Reactor Handbook (3 volumes), available for sale from the Technical Information Service, Oak Ridge, Tennessee; U.S. Patents 2,708,656 and 2,714,577 to Fermi et al.; and to "The Proceedings of the International Conference on Peaceful Uses of Atomic Energy," August 8–20, 1955, Geneva, Switzerland, available for sale at the United Nations' Book Store, New York, New York. For specific information concerning the processing of nuclear reactor fuel, reference is made to Glasstone, supra, chapter 7 (pages 371, 442).

In the operation of a nuclear reactor, a great variety of fission products are formed. Many of these elements have high neutron absorption cross-sections, and compete with the fissile material for available neutrons. They thus act as reactor "poisons," and if unremoved may threaten the continuation of the chain fission reaction. Plutonium is formed in uranium-fueled reactors, and if not recovered after its equilibrium concentration has been reached, may undergo fission at an uneconomical rate relative to its production, thereby sacrificing a valuable product. For these reasons reactor fuels are removed from a reactor for reprocessing long before the fissionable material has been consumed. The uranium in a spent fuel element therefore represents an extremely valuable material, which when decontaminated may be refabricated into fuel elements.

It is estimated that the present fuel reprocessing costs amount to as much as 25% of the total operating costs of a reactor. It can be appreciated that any reduction in this cost will greatly reduce the unit cost of generating power from nuclear reactors and improve the competitive position against power generated from fossil fuels. As indicated in the above references, the standard present method for decontaminating reactor fuels is by continuous solvent extraction methods. Typically in such methods, an aqueous uranyl nitrate solution is countercurrently contacted with an organic extractant, such as tributyl phosphate in an inert hydrocarbon diluent. The uranium and plutonium are extracted into the organic phase, while the majority of the fission products are confined to the aqueous phase. The uranium and plutonium are subsequently separately stripped from the separated organic phase with an acidified aqueous strip solution. There are severe economic drawbacks to the solvent extraction recovery methods. Firstly, the irradiated fuel must be stored for approximately sixty to ninety days to permit decay of short-lived fission products. This is done to reduce the radiation dosage received by the organic extractant, since organic materials decompose to some extent under nuclear irradiation. The unproductive storage of reactor fuels for several months prior to reprocessing greatly increases inventory charges. Then, before solid fuel can be introduced into the solvent extraction system, it must be dissolved with nitric acid to yield uranyl nitrate; likewise, upon completion of decontamination, the uranium must be reconverted to the metallic form for fuel element preparation. Each of these steps adds considerably to the reprocessing costs. The solutions treated are also relatively dilute and enormous volumes of radioactive solutions must be handled. This contributes to the major capital investment in a solvent extraction plant. Until such high costs can be reduced, nuclear reactors will remain at an economic disadvantage.

Many of the above difficulties are overcome in pyrometallurgical processes in which substantial decontamination is achieved by extracting fission products from metallic uranium in the molten phase with slagging methods. One such method is fused salt scrubbing, wherein a molten fluoride salt mixture of alkali and alkaline earth metals and $UF_4$ extract the majority of the fission products from the molten metal. These methods are described in U.S. Patent 2,758,023 to D. W. Bareis and in the copending application of the common assignee S.N. 602,076, filed August 3, 1956, in the name of Archie G. Buyers, for "Pyrochemical Decontamination Method for Reactor Fuel." While this method has a number of advantageous features over prior solvent extraction methods, there are a few operational drawbacks which diminish its full potential. The molten fluoride salt mixture is highly corrosive and finding a suitable container is difficult. Also, the molten uranium metal may likewise react with the container material, thereby reducing the product yield and increasing non-radioactive metallic contamination. The rate of extraction of fission products into the fused salt phase is known to be a function of the interphase area, and an increase in this area can be expected to yield improved extraction.

An object of our present invention, therefore, is to provide an apparatus and method for the decontamination of neutron-irradiated, reactor fuel.

Another object is to provide an improved salt scrubbing method for decontamination of such fuel and an apparatus therefor.

Another object is to provide such a method and apparatus which avoids container corrosion and increases contact surface area.

Still another object is to provide such a method and apparatus for the countercurrent contact of neutron-irradiated reactor fuel, wherein only a portion of the salt bed in contact with the fuel is maintained molten and does not contact the container material.

These and other objects and advantages of our invention will become apparent from the following detailed description and the attached drawings. In the drawings, Fig. 1 represents an elevation view of our apparatus, and Fig. 2 is a partial vertical section of Fig. 1.

In accordance with our invention, neutron irradiated reactor fuel may be decontaminated by countercurrently contacting said fuel with a bed of a fluoride salt under an inert gas atmosphere, selectively inductively melting said fuel, thereby causing said fuel to pass through said bed.

The heated reactor fuel may be decontaminated by positioning said fuel atop a frozen, columnar bed of a fluoride salt mixture, inductively melting said fuel, and tracing the resulting, descending molten metal with induction heating as it passes through said bed. The reactor fuel is a susceptor and is melted while the salt bed is not heated. By using the present method, at no time is the molten fuel slug or the locally melted salt bed in contact therewith next to the container wall. The temperature of the molten metal is maintained above the melting point of the salt and melts only the salt particles in its immediate vicinity. A large, continually fresh surface of salt is thus presented to the descending molten slug, which enhances the efficiency of the scrubbing operation.

The salt is chosen from those described in the above-mentioned patent and co-pending application. Thus, "fluoride salt" as used herein, may comprise alkali metal fluorides, alkaline earth fluorides, and $UF_4$, singly and in combination with each other. The preferred salt is calcium fluoride because of its very high melting point and efficient decontaminating ability. Preferably, the calcium fluoride is pre-dried and compressed into small briquettes, approximately 1½ in. diameter x 1 in. thick.

The salt bed may be used to decontaminate any reactor fuel. By "reactor fuel" is meant thorium, uranium and plutonium, and their compounds and alloys. Since the metal form or metal alloy (e.g., thorium-aluminum alloy) has a lower melting point that a compound such as the oxide, carbide, or nitride, the decontamination of the metals and their alloys is particularly facilitated by this method.

Referring now to Fig. 1, we see an apparatus for effecting our decontamination method. The salt bed and the fuel slug are contained in a reaction tube 1, typically of quartz. The tube is held by a metal collar 2 and the seal therebetween made wtih high melting wax. To prevent melting of the seal, it is cooled by passing water through a coil 3 surrounding collar 2. The collar 2 joins metal tube 4 at flange 5. The metal tube 4 passes to a vacuum system and to an inert gas (e.g., helium) supply source through line 4a. This assembly is supported by a metal arm 6 extending to a support frame. Non-metallic frame 7 carrying an induction coil 8 fits around reaction tube. The coil has electrical leads 9 and coolant lines 10. The frame is supported on a metal stand 11, sitting on a table 12. It travels along the length of the stand by rotation of a vertical screw 13 to follow the fuel as it passes through the bed; it is driven by a motor through a gear reduction box. In place of a moving coil, a series of individual fixed coils may be used, each being energized by a timing device as the molten slug passes it. As shown in more detail in Fig. 2, the coil 8 comprises copper tubing 14, the turns of which are separated with electrical insulation 15. Cooling water passes through the tubing. A bed of salt briquettes 16 is supported in reaction tube 1 by a plurality of small fingers 17 extending into tube 1 from its wall. Below the bottom of the salt bed a refractory crucible 18, such as alumina, is positioned to receive a fuel slug after it passes through the salt bed.

In the operation of this device, reaction tube 1 is separated from metal collar 2 at flange 5, the tube filled with calcium fluoride briquettes and the irradiated uranium fuel 19 placed on top of the bed. The reaction tube is evacuated through line by a vacuum pump. An inert or noble gas is then introduced into reaction tube. The induction coil is driven to the top of the tube opposite the uranium slug. The coil is energized and the coil and seal cooled with tap water. As the coil is energized, a magnetic field set up by the alternating current passing through the coil induces eddy currents in the reactor fuel. These eddy currents rapidly heat the slug above its melting point. Temperature of the slug is maintained about the melting point of the salt, and by conduction melts the salt particles in its immediate vicinity. Since the slug has a greater density than the fused salt, it settles through the salt bed, melting the salt locally as it follows its downward path, and the induction coil follows the slug in its downward path, continuing to heat the slug. The eddy currents melting the slug cause internal stirring of the molten slug, thereby subjecting substantially all of it to the scrubbing action of the salt bed. As shown in Fig. 2, the portion of salt bed 16 immediately about slug 19 is molten, but after the slug traverses this region, it again cools and solidifies. The area through which the slug has passed becomes partially filled with salt, but not to its previous density. After the slug traverses the entire salt bed, it drops into alumina crucible 18. The coil is then de-energized, the reactor reaction tube cooled to room temperature and the apparatus disassembled to remove the decontaminated fuel.

The following examples are offered to show the decontamination of neutron irradiated thorium-uranium alloy (10% uranium), irradiated to an integrated dose of approximately $10^{17}$, using the apparatus shown in the drawings. The bed was of pre-dried and compressed calcium fluoride briquettes.

TABLE I

*Travel through bed length and time of heating*

| Example No. | Sample Weight, gms. | Bed Length, Inches | Bed Weight, gms. | Time of Heating, min. | Percent Retention of U in Treated Metal |
|---|---|---|---|---|---|
| 1 | 11.14 | 1 | 30 | 3 | |
| 2 | 11.62 | 1½ | 53 | 5½ | 97 |
| 3 | 12.53 | 2¾ | 98 | 10 | 103 |
| 4 | 11.18 | 4½ | 158 | 16 | 99 |
| 5 | 12.0 | 6⅛ | 216 | 28 | 97 |

TABLE II

*Removal of fission products*

| Example No. | Percent Removal | | | | | | | |
|---|---|---|---|---|---|---|---|---|
| | Rare Earths | Ce | Cs | Te | Zr | Ru | Pa[A] | Sr |
| 1 | 37 | 35 | 35 | 69 | 8 | 0 | 7 | 59 |
| 2 | 73 | 75 | 45 | 82 | 7 | 0 | 10 | 70 |
| 3 | 75 | 84 | 39 | | 2 | 0 | 11 | 62 |
| 4 | 95 | 96 | 78 | | 3 | 8 | 13 | 95 |
| 5 | 97 | 98 | 92 | | 0 | 0 | 13 | 97 |

[A] Calculated in terms of total Pa added and total found in treated metal.

The above examples and apparatus are only illustrative and not restrictive of our invention. Variations in the apparatus can be made which still employ the principle of selectively inductively heating the fuel slug as it passes countercurrently through the salt bed. Therefore, our invention should be understood to be limited only as is indicated by the appended claims.

Having thus described our invention, we claim:

1. A method of decontaminating a neutron-irradiated impurity-containing reactor fuel composed of at least one member selected from the class consisting of the elements thorium, uranium, plutonium, comprising providing a reaction chamber containing a bed of a solid fluoride salt in particle form, said fluoride salt consisting of at least one member selected from the class consisting of alkali metal fluorides, alkali earth fluorides and uranium tetra fluoride; maintaining an inert gaseous atmosphere within said reaction chamber; placing said fuel on said salt bed; passing said fuel in a liquified form through said solid salt bed so as to contact said fuel with said solid salt thereby causing said impurities to be removed from said fuel and providing a purified fuel, and maintaining said fuel in said liquified form during said passage through said salt bed.

2. A method of decontaminating a neutron-irradiated impurity-containing reactor fuel composed of at least one member selected from the class consisting of the elements thorium, uranium, plutonium, comprising providing a reaction chamber containing a bed of a solid fluoride salt in particle form, said fluoride salt consisting of at least one member selected from the class consisting of alkali metal fluorides, alkali earth fluorides and uranium tetra fluoride; maintaining an inert gaseous atmosphere within said reaction chamber; placing said fuel in solid form on said salt bed; liquifying said fuel; passing said fuel in a liquified form through said solid salt bed so as to contact said fuel with said solid salt thereby causing said impurities to be removed from said fuel and providing a purified fuel; and maintaining said fuel in said liquified form during said passage through said salt bed.

3. A method of decontaminating a neutron-irradiated impurity-containing reactor fuel composed of at least one member selected from the class consisting of the elements thorium, uranium, plutonium, comprising providing a reaction vessel containing a receiving vessel and a bed of solid fluoride salt in particle form in a reaction zone of said reaction vessel, said fluoride salt consisting of at least one member selected from the class consisting of alkali metal fluorides, alkali earth fluorides and uranium tetra fluoride; maintaining an inert gaseous atmosphere within said reaction zone; placing said fuel in solid form on said salt bed; liquifying said fuel; passing said fuel in a liquified form through said solid salt bed so as to contact said fuel with said solid salt thereby causing said impurities to be removed from said fuel and providing a purified fuel; maintaining said fuel in said liquified form during said passage through said salt bed; and collecting said purified fuel in said receiving vessel.

4. A method of decontaminating a neutron-irradiated impurity-containing reactor fuel composed of at least one member selected from the class consisting of the elements thorium, uranium, plutonium, comprising providing a reaction chamber containing a bed of solid fluoride salt in particle form, said fluoride salt consisting of at least one member selected from the class consisting of alkali metal fluorides, alkali earth fluorides and uranium tetra fluoride; maintaining an inert gaseous atmosphere within said reaction chamber; placing said fuel in solid form on said salt bed; liquifying said fuel by induction heating; passing said fuel in liquified form through said solid salt bed so as to contact said fuel with said solid salt thereby causing said impurities to be removed from said fuel and providing a purified fuel, and maintaining said fuel in said liquified form during said passage through said salt bed by said induction heating.

5. A method of decontaminating a neutron-irradiated impurity-containing reactor fuel composed of at least one member selected from the class consisting of the elements thorium, uranium, plutonium, comprising providing a reaction vessel containing a receiving vessel and a bed of solid calcium fluoride salt in particle form in a reaction zone of said reaction vessel; placing said fuel in solid form on said calcium fluoride bed; liquifying said fuel by induction heating; passing said fuel in liquid form through said solid calcium fluoride bed so as to contact said fuel with said calcium fluoride thereby causing said impurities to be removed from said fuel and providing a purified fuel; maintaining said fuel in said liquified form during said passage through said calcium fluoride bed.

6. A method of decontaminating a neutron-irradiated impurity-containing reactor fuel composed of an uranium-thorium alloy containing 10 percent uranium comprising providing a reaction vessel containing a receiving vessel and a bed of solid calcium fluoride salt in particle form in a reaction zone of said reaction vessel; placing said fuels in solid form on said calcium fluoride bed; liquifying said fuel by induction heating; passing said fuel in a liquified form through said solid calcium fluoride bed so as to contact said fuel with said solid calcium fluoride thereby causing said impurities to be removed from said fuel and providing a purified fuel; maintaining said fuel in said liquified form during said passage through said salt bed and collecting said purified fuel in said receiving vessel.

7. A method of decontaminating a neutron-irradiated impurity-containing reactor fuel composed of a uranium and thorium alloy, comprising providing a reaction vessel containing a receiving vessel and a bed of solid calcium fluoride salt in particle form in a reaction zone of said reaction vessel; placing said fuel in solid form on said calcium fluoride bed; liquifying said fuel by induction heating; passing said fuel in liquid form through said solid calcium fluoride bed so as to contact said fuel with said calcium fluoride thereby causing said impurities to be removed from said fuel and providing a purified fuel; maintaining said fuel in said liquified form during said passage through said calcium fluoride bed.

References Cited in the file of this patent
UNITED STATES PATENTS

| | | |
|---|---|---|
| 1,472,006 | Jones | Oct. 23, 1923 |
| 2,602,211 | Scaff et al. | July 8, 1952 |
| 2,743,199 | Hull et al. | Apr. 24, 1956 |
| 2,758,028 | Bareis | Aug. 7, 1956 |
| 2,787,536 | Spedding et al. | Apr. 2, 1957 |